US008847940B2

(12) United States Patent
Chung

(10) Patent No.: US 8,847,940 B2
(45) Date of Patent: Sep. 30, 2014

(54) DISPLAY APPARATUS AND METHOD OF OPERATING THE SAME

(75) Inventor: Ho-Ryun Chung, Yongin (KR)

(73) Assignee: Samsung Display Co., Ltd., Yongin, Gyeonggi-Do (KR)

( * ) Notice: Subject to any disclaimer, the term of this patent is extended or adjusted under 35 U.S.C. 154(b) by 394 days.

(21) Appl. No.: 12/923,068

(22) Filed: Aug. 31, 2010

(65) Prior Publication Data

US 2011/0187693 A1 Aug. 4, 2011

(30) Foreign Application Priority Data

Feb. 2, 2010 (KR) ........................ 10-2010-0009557

(51) Int. Cl.
*G06F 3/038* (2013.01)
*G09G 5/00* (2006.01)

(52) U.S. Cl.
CPC ........................................ *G09G 5/00* (2013.01)
USPC ............................................. 345/211; 345/76

(58) Field of Classification Search
USPC .................................................. 345/211–215
See application file for complete search history.

(56) References Cited

U.S. PATENT DOCUMENTS

2002/0175662 A1* 11/2002 Sakurai et al. ................ 323/312
2003/0156104 A1* 8/2003 Morita .......................... 345/204
2004/0104908 A1* 6/2004 Toyozawa et al. ............ 345/211
2005/0140600 A1* 6/2005 Kim et al. ....................... 345/76
2006/0066531 A1 3/2006 Park et al.
2007/0040772 A1* 2/2007 Kim ................................ 345/76
2007/0146253 A1 6/2007 Tang
2008/0170014 A1* 7/2008 Jung et al. ....................... 345/82

FOREIGN PATENT DOCUMENTS

EP 1640965 A1 3/2006
JP 2007-171949 7/2007
KR 10 1999-0015673 A 3/1999
KR 10 2005-0025511 A 3/2005
KR 10 2006-0028022 A 3/2006
KR 10-2008-0001255 A 1/2008
KR 10-2008-0032694 A 4/2008
KR 10-2008-0062774 A 7/2008

OTHER PUBLICATIONS

Korean Office Action in KR 10-2010-0009557, dated Jul. 1, 2011 (Chung).
Korean Notice of Allowance in KR 2010-0009557, dated Sep. 30, 2011 (Chung).

* cited by examiner

*Primary Examiner* — Abbas Abdulselam
*Assistant Examiner* — Gerald Oliver
(74) *Attorney, Agent, or Firm* — Lee & Morse, P.C.

(57) ABSTRACT

Provided are a display apparatus and a method of operating the display apparatus that generate data signals that compensate for a deviation of a first power supply voltage output from a direct current (DC)-DC converter.

23 Claims, 6 Drawing Sheets

DISPLAY APPARATUS AND METHOD OF OPERATING THE SAME

BACKGROUND

1. Field of the Invention

Embodiments relate to a display apparatus for displaying uniform brightness and a method of operating the same.

2. Description of the Related Art

A display apparatus includes a direct current (DC)-DC converter which supplies a power supply voltage to a display module. The display module applies data signals generated by a data driver to a plurality of pixel circuits to adjust brightness of each pixel. The data driver generates a plurality of gamma voltages from a gamma filter voltage, generates a plurality of data signals from the plurality of gamma voltages, and outputs the plurality of data signals to a plurality of pixels.

SUMMARY

It is therefore a feature of an embodiment to provide a display apparatus and method compensating for a deviation of a first power supply voltage output from a direct current (DC)-DC converter.

It is another feature of an embodiment to provide a display apparatus and method to generate data signals that compensate for a deviation of a first power supply voltage output from a DC-DC converter.

It is another feature of an embodiment to provide a display apparatus and method displaying uniform brightness.

At least one of the above and other features and advantages may be realized by providing a display apparatus including a display module and a direct current (DC)-DC converter external to the display module. The DC-DC converter applies a first power supply voltage to the display module. The display module generates data signals that compensate for a deviation of the first power supply voltage.

The display module may include a data driver which compensates for the deviation of the first power supply voltage to generate the data signals and outputs the data signals to a plurality of pixel circuits and a scan driver which generates scan signals and outputs the scan signals to the plurality of pixel circuits. The plurality of pixel circuits receive the first power supply voltage from the DC-DC converter, the data signals from the data driver, and the scan signals from the scan driver.

The data driver may include a voltage deviation determiner which determines the deviation of the first power supply voltage, a voltage deviation compensator which applies the deviation of the first power supply voltage to a gamma filter power supply voltage to generate a compensated gamma filter power supply voltage, and a gamma voltage generator which generates a plurality of gamma voltages from the compensated gamma filter power supply voltage, wherein the data signals are generated from the plurality of gamma voltages.

The voltage deviation determiner may compare the first power supply voltage with a reference voltage to determine the deviation of the first power supply voltage.

The voltage deviation compensator may add and/or subtract the deviation of the first power supply voltage to and/or from the gamma filter power supply voltage to generate the compensated gamma filter power supply voltage.

The voltage deviation compensator may add and/or subtract a gamma filter power supply voltage offset matched to the deviation of the first power supply voltage to and/or from the gamma filter power supply voltage to generate the compensated gamma filter power supply voltage.

The display apparatus may be an organic light-emitting display apparatus.

At least one of the above and other features and advantages may be realized by providing a method of operating a display module configured to receive a first power supply voltage from a DC-DC converter external to the display module, the method including receiving the first power supply voltage, generating a plurality of data signals that compensate for a deviation of the first power supply voltage, and outputting the plurality of data signals to a plurality of pixel circuits in the display module.

Generating data signals may include determining the deviation of the first power supply voltage, applying the deviation of the first power supply voltage to a gamma filter power supply voltage and generating a compensated gamma filter power supply voltage, generating a plurality of gamma voltages from the compensated gamma filter power supply voltage, and generating the plurality of data signals from the plurality of gamma voltages.

Determining may include comparing the first power supply voltage with a reference voltage to determine the deviation of the first power supply voltage.

The method may further include adding and/or subtracting the deviation of the first power supply voltage to and/or from the gamma filter supply voltage to generate the compensated gamma filter power supply voltage.

The method may further include adding and/or subtracting a gamma filter power supply voltage offset matched to the deviation of the first power supply voltage to and/or from the gamma filter power supply voltage to generate the compensated gamma filter power supply voltage.

The display apparatus may be an organic light-emitting display apparatus.

At least one of the above and other features and advantages may be realized by providing a display module configured to receive a first power supply voltage from a DC-DC converter external to the display module, the display module including a plurality of pixel circuits receiving the first power supply voltage, and a data driver configured to generate a plurality of data signals that compensate for a deviation of the first power supply voltage and output the plurality of data signals to the plurality of pixel circuits.

BRIEF DESCRIPTION OF THE DRAWINGS

The above and other features and advantages will become more apparent to those of ordinary skill in the art by describing in detail exemplary embodiments with reference to the attached drawings, in which.

DETAILED DESCRIPTION

Figure 1:
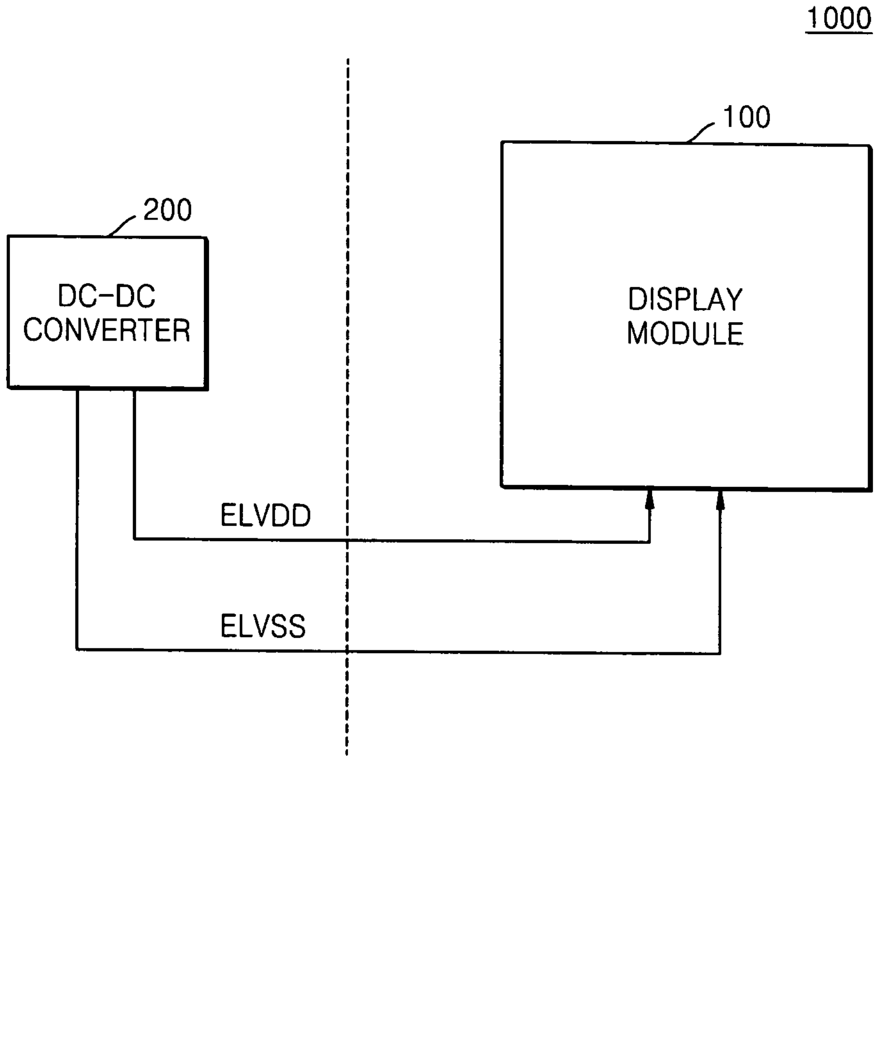
FIG. 1 illustrates a block diagram of a display apparatus according to an embodiment.

Korean Patent Application No. 10-2010-0009557, filed on Feb. 2, 2010, in the Korean Intellectual Property Office, and entitled: "Display Apparatus and Method of Operating the Same," is incorporated by reference herein in its entirety.

Example embodiments will now be described more fully hereinafter with reference to the accompanying drawings; however, they may be embodied in different forms and should not be construed as limited to the embodiments set forth herein. Rather, these embodiments are provided so that this disclosure will be thorough and complete, and will fully convey the scope of the invention to those skilled in the art. Like reference numerals in the drawings denote like elements.

It will be understood that, although the terms first, second, third etc. may be used herein to describe various elements, components, regions, layers and/or sections, these elements, components, regions, layers and/or sections should not be limited by these terms. These terms are only used to distinguish one element, component, region, layer or section from another region, layer or section. Thus, a first element, component, region, layer or section discussed below could be termed a second element, component, region, layer or section without departing from the teachings of example embodiments.

The terminology used herein is for the purpose of describing particular embodiments only and is not intended to be limiting of example embodiments. As used herein, the singular forms "a," "an" and "the" are intended to include the plural forms as well, unless the context clearly indicates otherwise. It will be further understood that the terms "comprises" and/or "comprising" when used in this specification, specify the presence of stated features, integers, steps, operations, elements, and/or components, but do not preclude the presence or addition of one or more other features, integers, steps, operations, elements, components, and/or groups thereof.

FIG. 1 illustrates a block diagram of a display apparatus 1000 according to an embodiment. Referring to FIG. 1, the display apparatus 1000 includes a direct current (DC)-DC converter 200 and a display module 100.

The DC-DC converter 200 is external to the display module 100 and applies a power supply source to the display module 100. In more detail, the DC-DC converter 200 receives a predetermined voltage from a power supply source (not shown), e.g., a battery or the like, converts the predetermined voltage into a first power supply voltage ELVDD and a second power supply voltage ELVSS that the display module 100 requires, and applies the first and second power supply voltages ELVDD and ELVSS to the display module 100. The DC-DC converter 200 according to embodiments may be installed in a cellular phone set or the like.

The display module 100 displays an image using input image data. The display module 100 includes a panel 140 having a plurality of pixel circuits P, a scan driver 130, a data driver 120, and a timing controller 110. The display module 100 according to the present embodiment compensates for a deviation of the first power supply voltage ELVDD supplied from the DC-DC converter 200 to generate a plurality of data signals $D_1$, $D_2$, . . . , and $D_M$, and applies the data signals $D_1$, $D_2$, . . . , and $D_M$ to the plurality of pixel circuits P to remove a brightness deviation.

Figure 2:
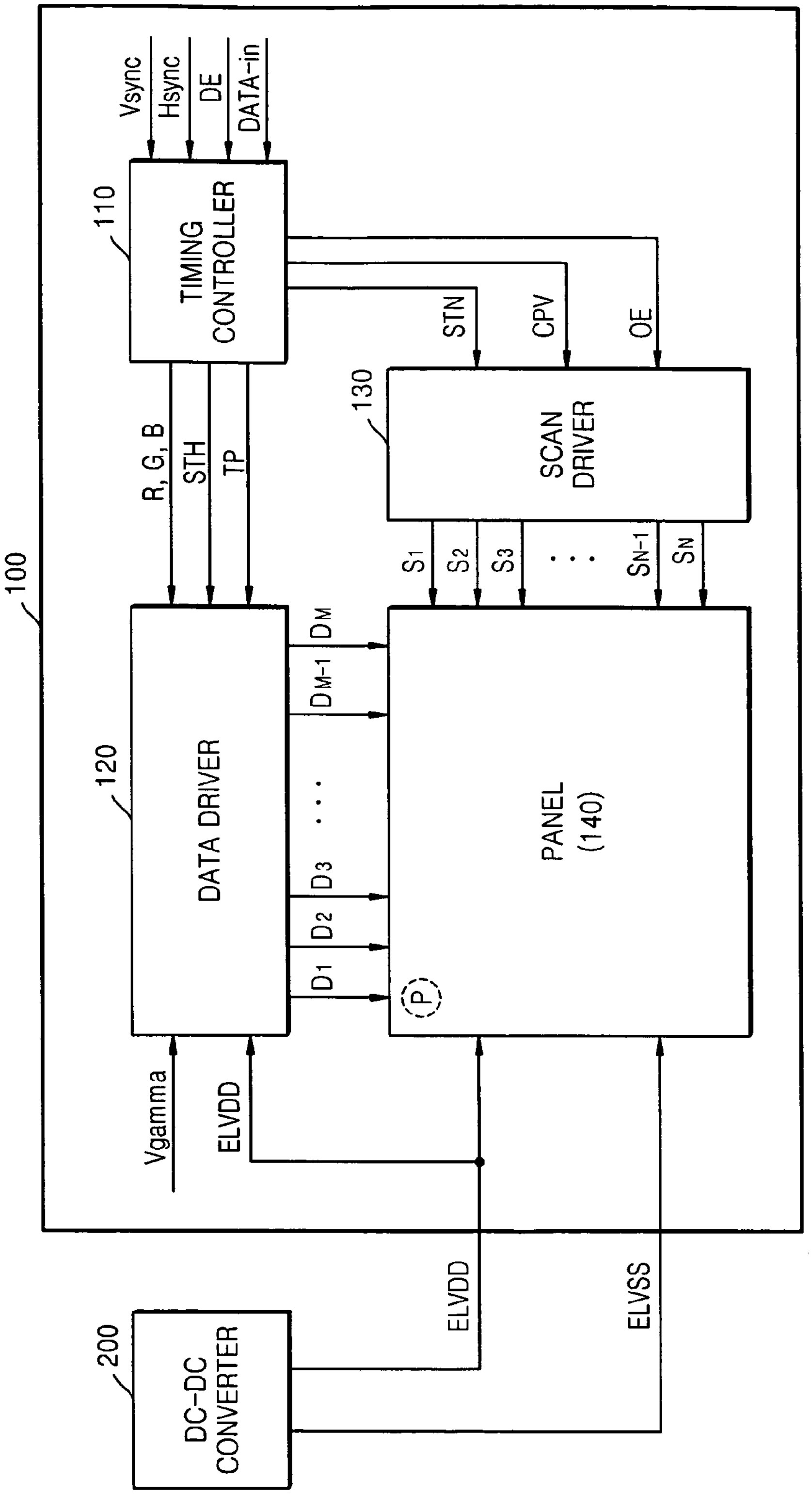
FIG. 2 illustrates a block diagram of a display module according to an embodiment.

FIG. 2 illustrates a block diagram of the display module 100, according to an embodiment. As illustrated in FIG. 2, the display module 100 may include a timing controller 100, a data driver 120, a scan driver 130, and a display panel 140.

Referring to FIG. 2, the timing controller 110 may receive a vertical synchronizing signal Vsync, a horizontal synchronizing signal Hsync, a data enable signal DE, and an image data signal DATA_in, convert the image data signal DATA_in into R, G, and B data signals appropriate for characteristics of the data driver 120, and outputs the R, G, and B data signals to the data driver 120. The timing controller 110 generates a start horizontal signal STH and a load signal TP for providing reference timing for outputting the data signals $D_1$, $D_2$, . . . , and $D_M$ from the data driver 120 to the plurality of pixel circuits P and outputs the start horizontal signal STH and the load signal TP to the data driver 120.

The timing controller 110 outputs a start vertical signal STV for selecting a first scan line, a gate clock signal CPV for sequentially selecting a next scan line, and an output enable signal OE for controlling an output of the scan driver 130 to the scan driver 130.

The data driver 120 includes a plurality of data driver integrated circuits (ICs). The data driver 120 receives the R, G, and B data signals, the start horizontal signal STH, and the load signal TP from the timing controller 110 to generate the data signals $D_1$, $D_2$, . . . , and $D_M$, and respectively outputs the data signals $D_1$, $D_2$, . . . , and DM to data lines. The data signals $D_1$, $D_2$, . . . , and $D_M$ are applied to the plurality of pixel circuits P. According to the present embodiment, the data driver 120 compensates for the deviation of the first power supply voltage ELVDD to generate the data signals $D_1$, $D_2$, . . . , and $D_M$ and respectively outputs the data signals $D_1$, $D_2$, . . . , and $D_M$ to the data lines.

The scan driver 130 includes a plurality of scan driver ICs. The scan driver 130 applies scan signals $S_1$, $S_2$, . . . , and $S_N$ to scan lines of the plurality of pixel circuits P according to the gate clock signal, the start vertical signal STV, and the output enable signal OE to sequentially scan the plurality of pixel circuits P respectively connected to the scan lines.

The panel 140 includes the plurality of pixel circuits P arrayed in a two-dimensional matrix of M×N (where M and N are natural numbers). The plurality of pixel circuits P are driven by the scan signals $S_1$, $S_2$, . . . , and $S_N$ and the data signals $D_1$, $D_2$, . . . , and $D_M$ and emit light according to voltage levels of the data signals $D_1$, $D_2$, . . . , and $D_M$. The DC-DC converter 200, which is installed outside the display module 100, applies the first and second power supply voltages ELVDD and ELVSS to the plurality of pixel circuits P in order to drive the plurality of pixel circuits P. The plurality of pixel circuits P according to an embodiment of the present invention will be described in detail later with reference to FIG. 5.

Figure 3:
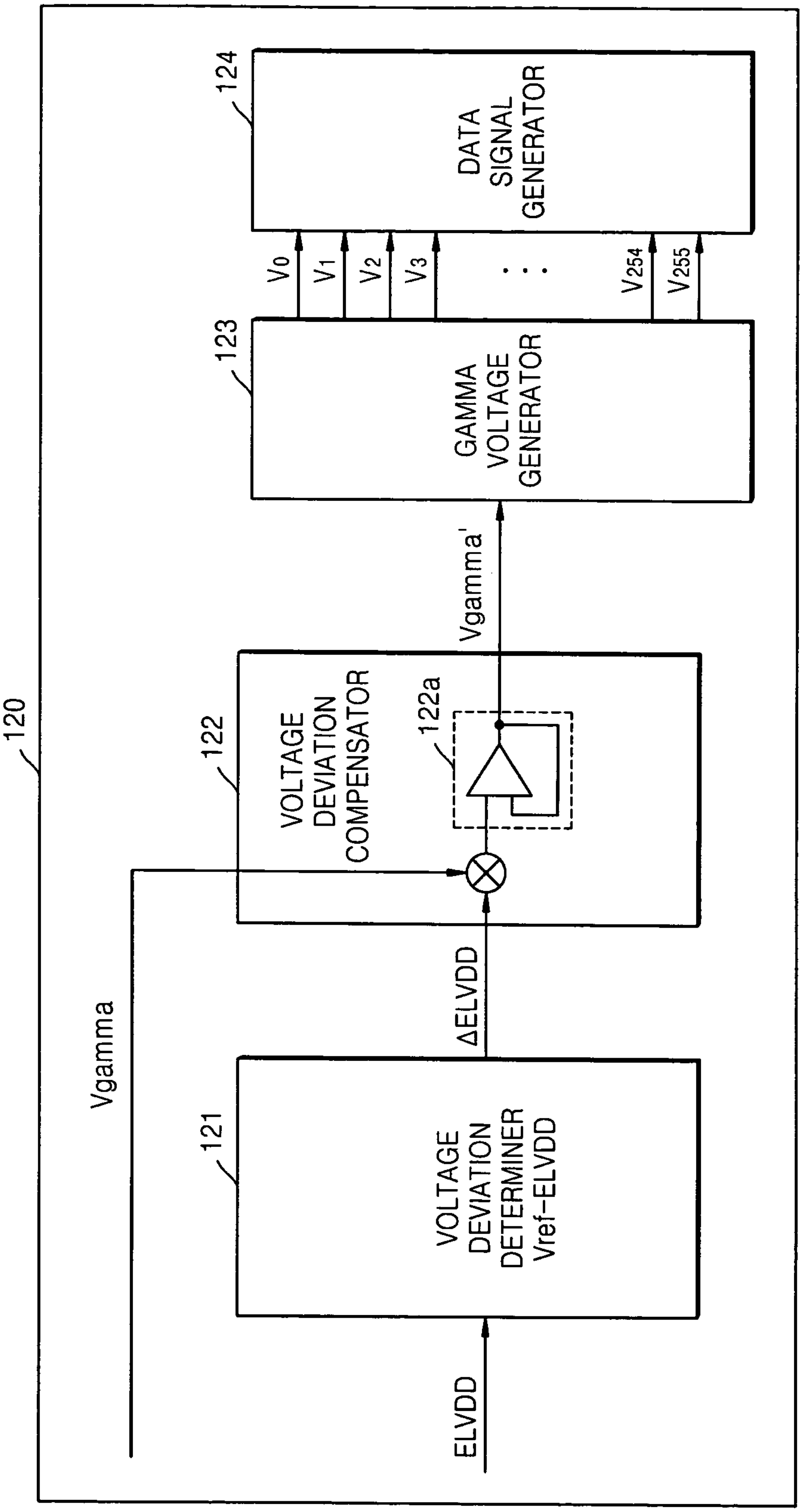
FIG. 3 illustrates a block diagram of a data driver according to an embodiment.

FIG. 3 illustrates a block diagram of the data driver 120, according to an embodiment. Referring to FIG. 3, the data driver 120 may include a voltage deviation determiner 121, a voltage deviation compensator 122, a gamma voltage generator 123, and a data signal generator 124.

The voltage deviation determiner 121 receives the first power supply voltage ELVDD from the DC-DC converter 200 installed outside the display module 100 and determines the deviation of the first power supply voltage ELVDD. According to the present embodiment, the voltage deviation determiner 121 receives a DC voltage component of the first power supply voltage ELVDD from the DC-DC converter 200 installed outside the display module 100 and determines a difference between a DC voltage component of a reference voltage Vref and the DC voltage component of the first power supply voltage ELVDD.

The voltage deviation determiner 121 determines a difference between the first power supply voltage ELVDD and the reference voltage Vref. The reference voltage Vref is generated by the voltage deviation determiner 121 to measure a deviation ΔELVDD of the first power supply voltage ELVDD. Although not shown in FIG. 3, the voltage deviation determiner 121 may include a reference voltage generator which generates the reference voltage Vref. For example, when the first power supply voltage ELVDD is 4.5V, and the reference voltage Vref is 4.6V, the deviation ΔELVDD of the first power supply voltage ELVDD is −0.1 V.

The operation of the voltage deviation determiner 121 is not limited to the above operation, but the voltage deviation determiner 121 may convert the first power supply voltage ELVDD into a digital value through an analog-to-digital converter (ADC), compare the digital value with a digital value of the reference voltage Vref, and determine the deviation ΔELVDD of the first power supply voltage ELVDD.

The voltage deviation compensator 122 applies the deviation ΔELVDD of the first power supply voltage ELVDD obtained by the first voltage deviation determiner 121 to a gamma filter power supply voltage Vgamma to generate a compensated gamma filter power supply voltage Vgamma'. The gamma filter power supply voltage Vgamma may be a voltage generated from a separate voltage source to generate a plurality of gamma voltages V0, V1, . . . , V255 or may be a voltage generated by dividing a separate power supply voltage applied from the DC-DC converter 200.

The voltage deviation compensator 122 adds and/or subtracts the deviation ΔELVDD of the first power supply voltage ELVDD obtained by the voltage deviation determiner 121 to and/or from the gamma filter power supply voltage Vgamma to generate the compensated gamma filter power supply voltage Vgamma'. The voltage deviation compensator 122 adds and/or subtracts the deviation ΔELVDD of the first power supply voltage ELVDD to and/or from the gamma filter power supply voltage Vgamma so as to reflect the deviation ΔELVDD of the first power supply voltage ELVDD on voltage levels of the finally generated data signals $D_1$, $D_2$, . . . , $D_M$.

A method of applying the deviation LELVDD of the first power supply voltage ELVDD to the gamma filter power supply voltage Vgamma will now be described in more detail in accordance with an embodiment. The deviation LELVDD of the first power supply voltage ELVDD may be applied to the gamma filter power supply voltage Vgamma so as to reflect the deviation ΔELVDD of the first power supply voltage ELVDD on a data voltage Vdata which is applied from the data driver 120 to the pixel circuits P. For example, the deviation ΔELVDD of the first power supply voltage ELVDD may not be directly added and/or subtracted to and/or from the gamma filter power supply voltage Vgamma, but a gamma filter power supply voltage offset Vgamma-offset matching the deviation ΔELVDD of the first power supply voltage ELVDD may be added and/or subtracted to and/or from the gamma filter power supply voltage Vgamma. The gamma filter power supply voltage offset Vgamma-offset may match with the deviation ΔELVDD of the first power supply voltage ELVDD and may be obtained from a look-up table. The gamma filter power supply voltage offset Vgamma-offset may be determined using an algorithm or may be determined by summing result values obtained from repeated experiments. However, the method of applying the deviation ΔELVDD of the first power supply voltage ELVDD to the gamma filter power supply voltage Vgamma is not limited thereto, and various mathematical and experimental methods may be applied.

The voltage deviation compensator 122 according to the present embodiment includes a source follower 122*a* which amplifies the compensated gamma filter power supply voltage Vgamma'.

The compensated gamma filter power supply voltage Vgamma' is applied to the gamma voltage generator 123.

The gamma voltage generator 123 generates the plurality of gamma voltages V0, V1, . . . , V255 from the compensated gamma filter power supply voltage Vgamma'. In more detail, the gamma voltage generator 123 receives the compensated gamma filter power supply voltage Vgamma' from the voltage deviation compensator 122, divides the compensated gamma filter power supply voltage Vgamma' through a resistance string (R-string) to generate the gamma voltages V0, V1, . . . , V255, and applies the gamma voltages V0, V1, . . . , V255 to the data signal generator 124. The gamma voltage generator 123 may respectively generate different gamma voltages with respect to the R, G, and B data signals. The number of gamma voltages V0, V1, . . . , V255 may vary according to the R-string and is not limited to 256.

Figure 4:
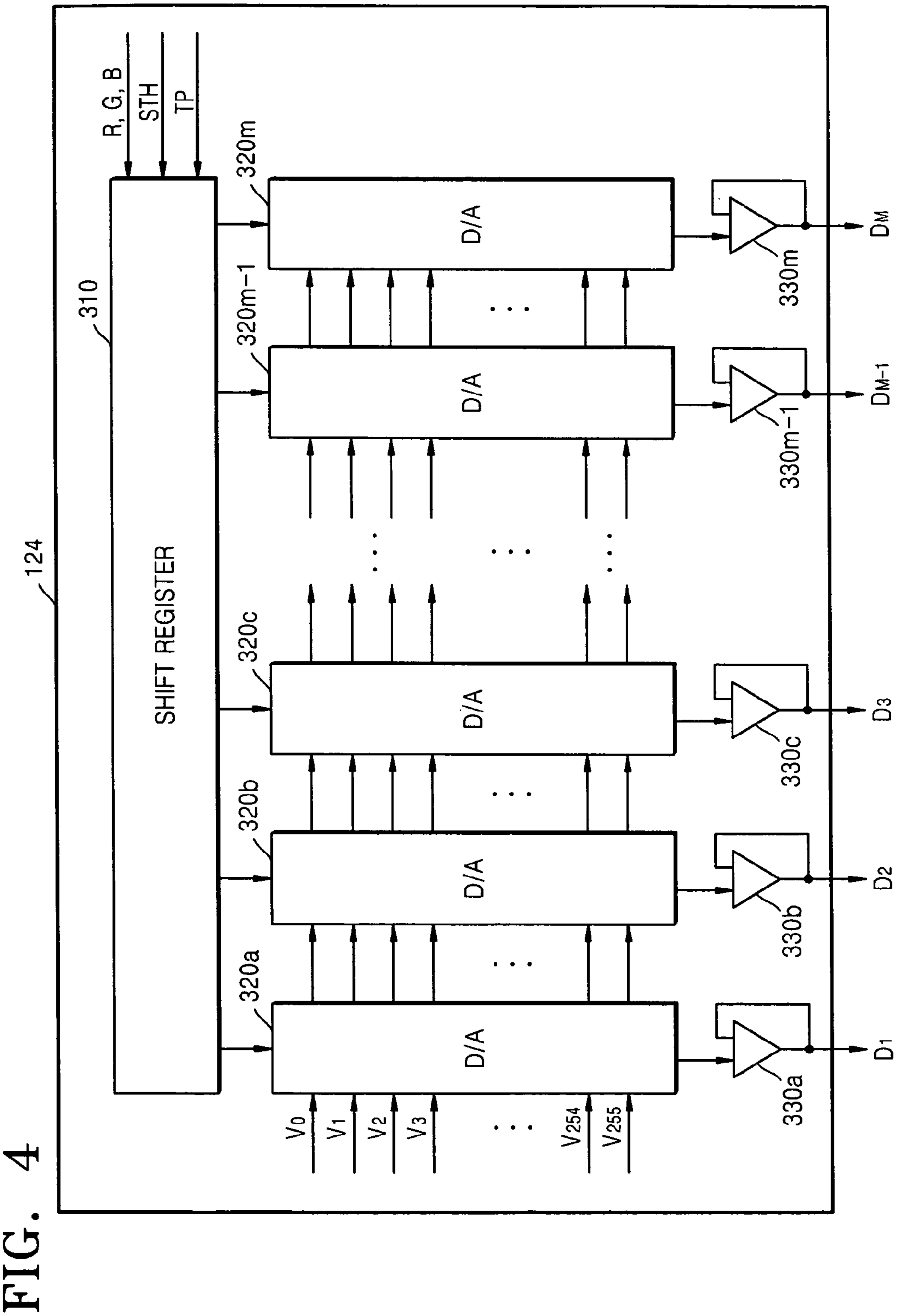
FIG. 4 illustrates a block diagram of a data signal generator of FIG. 3, according to an embodiment.

FIG. 4 illustrates a block diagram of the data signal generator 124 of FIG. 3, according to an embodiment. As illustrated therein, the data signal generator 124 may include a plurality of digital-to-analog converters (DACs) 320*a*, 320*b*, . . . , 320*m*, The data signal generator 124 receives the plurality of gamma voltages V0, V1, . . . , V255 from the gamma voltage generator 123. The plurality of gamma voltages V0, V1, . . . , V255 are applied to the plurality of DACs 320*a*, 320*b*, . . . , 320*m*, a plurality of data signal output units 330*a*, 330*b*, 330*c*, . . . , 330*m*, and a shift register 310.

The plurality of DACs 320*a*, 320*b*, . . . , 320*m* select gamma voltages corresponding to the R, G, and B data signals from the plurality of gamma voltages V0, V1, . . . , V255 input from the gamma voltage generator 123 and respectively output the selected gamma voltages to the plurality of data signal output units 330*a*, 330*b*, 330*c*, . . . , 330*m*.

The shift register 310 receives the start horizontal signal STH, the load signal TP, and the R, G, and B data signals from the timing controller 110 and outputs the R, G, and B data signals to the DACs 320*a*, 320*b*, . . . , 320*m* respectively corresponding to data lines.

The plurality of data signal output units 330*a*, 330*b*, 330*c*, . . . , 330*m* amplify the gamma signals input from the DACs 320*a*, 320*b*, . . . , 320*m* and respectively output the data signals $D_1$, $D_2$, . . . , and $D_M$ to the data lines. The plurality of data signal output units 330*a*, 330*b*, 330*c*, . . . , 330*m* may be realized using a voltage follower.

Figure 5:
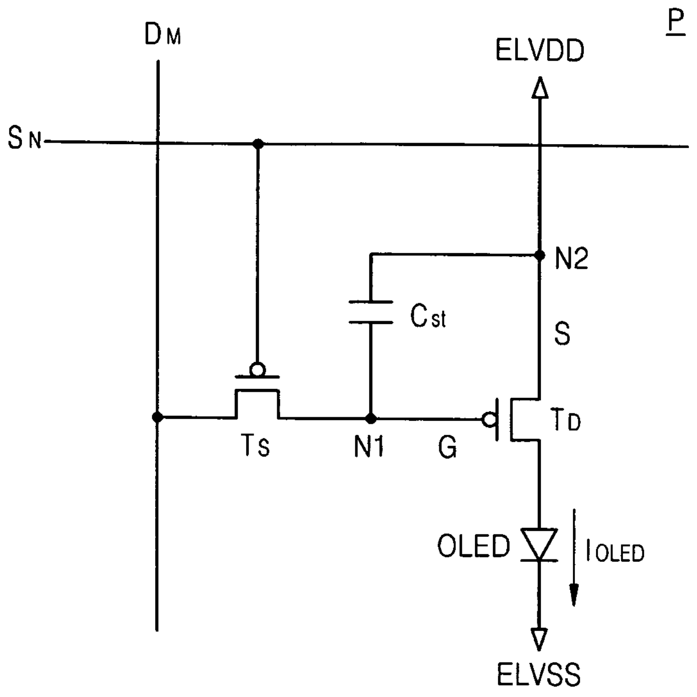
FIG. 5 illustrates a circuit diagram of a pixel circuit according to an embodiment.

FIG. 5 illustrates a circuit diagram of a pixel circuit P according to an embodiment. The pixel circuit P according to the present embodiment includes a switching transistor Ts, a driving transistor $T_D$, a storage capacitor Cst, and an organic light-emitting device. The organic light-emitting device may include an organic light-emitting diode (OLED).

When a scan signal $S_N$ is applied, the switching transistor Ts is turned on, and the data signal $D_M$ is applied to a first node N1. Thus, a voltage of the first node N1 may have a voltage level equal to that of the data signal $D_M$. The first power supply voltage ELVDD is applied from the DC-DC converter 200 to the pixel circuit P. Thus, a voltage of a second node N2 may be the first power supply voltage ELVDD. The driving transistor $T_D$ outputs a driving current to the OLED by a driving voltage which is determined according to a difference Vgs between voltages of a gate electrode G and a source electrode S as in Equation 1.

$$I\text{oled}=(\text{Vgs}-\text{Vth})^2 \quad (1)$$

In FIG. 5, the difference Vgs between the voltages of the gate electrode G and the source electrode S is equal to a difference between the first power supply voltage ELVDD and the data voltage Vdata.

The data voltage Vdata is a value generated by the data driver 120 in consideration of the deviation ΔELVDD of the first power supply voltage ELVDD. Therefore, although a voltage dispersion of the first power supply voltage ELVDD applied from the DC-DC converter 200 to the pixel circuit P is not compensated, i.e., the deviation ΔELVDD of the first power supply voltage ELVDD exists, the voltage dispersion of the first power supply voltage ELVDD is offset by the deviation ΔELVDD of the first power supply voltage ELVDD which has been reflected in the data voltage Vdata. Thus, the deviation ΔELVDD of the first power supply voltage ELVDD is removed from a difference Vgs. As a result, when a driving current from which the deviation ΔELVDD of the first power supply voltage ELVDD has been removed is output, a brightness deviation may be reduced or eliminated from the display module 100, and the display module 100 displays a high-quality image.

Figure 6:
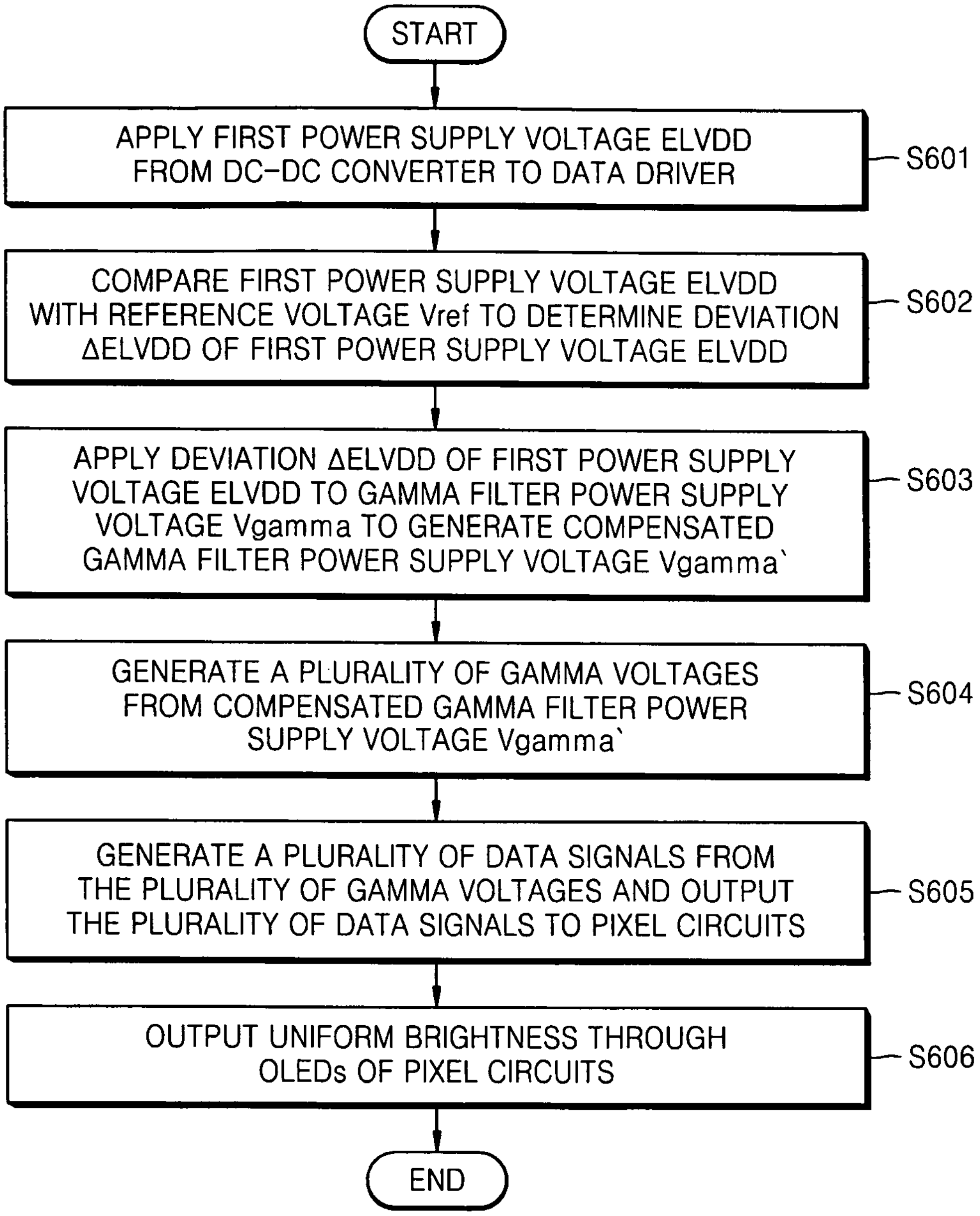
FIG. 6 illustrates a flowchart of a method of operating a display apparatus according to an embodiment.

FIG. 6 illustrates a flowchart of a method of operating the display apparatus 1000, according to an embodiment.

Referring to FIG. 6, the display apparatus 100 includes the DC-DC converter 200 external to the display module 100 as shown in FIG. 1 and applies the first power supply voltage ELVDD to the display module 100. Since the DC-DC converter 200 is installed outside the display module 100, the first power supply voltage ELVDD applied to the display module 100 may not be uniform. Therefore, in the present embodiment, the data signals $D_1, D_2, \ldots, D_M$, applied to the display module 100 are generated in consideration of the deviation ΔELVDD of the first power supply voltage ELVDD, in order to remove the deviation ΔELVDD of the first power supply voltage ELVDD. As a result, the display module 100 provides a high-quality image having uniform brightness.

In operation S601, the first power supply voltage ELVDD is applied from the DC-DC converter 200 to the data driver 120.

In operation S602, the data driver 120 compares the first power supply voltage ELVDD with the reference voltage Vref to determine the deviation AELVDD of the first power supply voltage ELVDD.

In operation S603, the deviation ΔELVDD of the first power supply voltage ELVDD is added and/or subtracted to and/or from the gamma filter power supply voltage Vgamma to generate the compensated gamma filter power supply voltage Vgamma'.

In operation S604, the data driver 120 generates the plurality of gamma voltages V0, V1, . . . , V255 from the compensated gamma filter power supply voltage Vgamma'.

In operation 5605, the data driver 120 generates the plurality of data signals $D_1, D_2, \ldots, D_M$ from the plurality of gamma voltages V0, V1, . . . , V255 and outputs the plurality of data signals $D_1, D_2, \ldots, D_M$ to the plurality of pixel circuit P.

In operation S606, the OLEDs included in the plurality of pixel circuits P output uniform brightness corresponding to the data signals $D_1, D_2, \ldots, D_M$ in which the deviation ΔELVDD of the first power supply voltage ELVDD has been compensated.

According to the present embodiment, cost of parts is reduced regardless of low price of a power supply circuit which applies the first power supply voltage ELVDD. In other words, since the data driver 120 of the display module 100 compensates for the deviation ΔELVDD of the first power supply voltage ELVDD, a less expensive DC-DC converter, i.e., a DC-DC converter having a less uniform output, may be used to supply power to the display module 100. Thus, although the deviation ΔELVDD of the first power supply voltage ELVDD applied to the panel 140 may be great, the deviation ΔELVDD does not affect brightness.

As described above, in a display apparatus and a method of operating the display apparatus according to the present embodiment, data signals that compensate for a deviation of a first power supply voltage output from a DC-DC converter are generated. The data signals are applied to pixel circuits so that OLEDs of the pixel circuits display uniform brightness.

As described above, the display apparatus 1000 generates data signals which compensate for a deviation ΔELVDD of the first power supply voltage ELVDD, but example embodiments are not limited thereto. Alternatively, the display apparatus 1000 may generate data signals which compensate for a deviation ΔELVSS of a second power supply voltage ELVSS.

Exemplary embodiments have been disclosed herein, and although specific terms are employed, they are used and are to be interpreted in a generic and descriptive sense only and not for purpose of limitation. Accordingly, it will be understood by those of ordinary skill in the art that various changes in form and details may be made without departing from the spirit and scope of the present invention as set forth in the following claims.

What is claimed is:

1. A display apparatus, comprising:

a display module;

a direct current (DC)-DC converter coupled to the display module, the DC-DC converter being configured to apply a first power supply voltage to the display module, a voltage deviation determiner to generate a value corresponding to a deviation of the first power supply voltage from a reference voltage;

a compensator to change a power supply voltage of a gamma filter to generate a compensated gamma filter power supply voltage, the compensator to change the gamma filter power supply voltage based on the value corresponding to the deviation of the first power supply voltage; and a data driver to adjust a plurality of data signals to be applied to a plurality of pixel circuits of the display module based on the compensated gamma filter power supply voltage.

2. The display apparatus as claimed in claim 1, wherein:

the display module comprises the data driver and a scan driver configured to generate scan signals and to output the scan signals; and the plurality of pixel circuits are configured to receive the first power supply voltage from the DC-DC converter, the data signals from the data driver, and the scan signals from the scan driver.

3. The display apparatus as claimed in claim 2, further comprising:

a gamma voltage generator configured to generate a plurality of gamma voltages from the compensated gamma filter power supply voltage, wherein the data signals are adjusted based on the plurality of gamma voltages.

4. The display apparatus as claimed in claim 3, wherein the voltage deviation determiner compares the first power supply voltage with the reference voltage to determine the deviation of the first power supply voltage.

5. The display apparatus as claimed in claim 3, wherein the compensator adds or subtracts value corresponding to the deviation of the first power supply voltage to or from the gamma filter power supply voltage to generate the compensated gamma filter power supply voltage.

6. The display apparatus as claimed in claim 3, wherein the compensator adds or subtracts a gamma filter power supply voltage offset matched to the deviation of the first power supply voltage to or from the gamma filter power supply voltage to generate the compensated gamma filter power supply voltage.

7. The display apparatus as claimed in claim 1, wherein the display apparatus is an organic light-emitting display apparatus.

8. The display apparatus as claimed in claim 1, wherein the display module includes a controller configured to control the data driver, the controller does not supply signals to the DC-DC converter.

9. The display apparatus as claimed in claim 1, wherein the first power supply voltage is applied to pixel circuits of the display module with the deviation from the reference voltage.

10. The display apparatus as claimed in claim 1, wherein the data driver adjusts the plurality of data signals in proportion to the deviation of the first power supply voltage from the reference voltage.

11. A method of operating a display module configured to receive a first power supply voltage from a DC-DC converter external to the display module, the method comprising:

receiving the first power supply voltage;

generating a value corresponding to a deviation of the first power supply voltage from a reference voltage;

changing a power supply voltage of a gamma filter to generate a compensated gamma filter power supply voltage, the power supply voltage of the gamma filter changed based on the value corresponding to the deviation of the first power supply voltage;

generating a plurality of data signals that compensate for deviation of the first power supply voltage, the generating including adjusting the plurality of data signals based on the compensated gamma filter power supply voltage; and outputting the plurality of data signals to a plurality of pixel circuits in the display module.

12. The method as claimed in claim 11, wherein generating data signals includes:

generating a plurality of gamma voltages from the compensated gamma filter power supply voltage; and adjusting the plurality of data signals based on the plurality of gamma voltages.

13. The method as claimed in claim 12, further comprising:

comparing the first power supply voltage with the reference voltage to determine the value corresponding to the deviation of the first power supply voltage.

14. The method as claimed in claim 12, further comprising adding or subtracting the deviation of the first power supply voltage to or from the gamma filter supply voltage to generate the compensated gamma filter power supply voltage.

15. The method as claimed in claim 12, further comprising adding or subtracting a gamma filter power supply voltage offset matched to the deviation of the first power supply voltage to or from the gamma filter power supply voltage to generate the compensated gamma filter power supply voltage.

16. The method as claimed in claim 11 wherein the display module is an organic light-emitting display apparatus.

17. The method as claimed in claim 11, wherein the first power supply voltage is applied to pixel circuits of the display module with the deviation from the reference voltage.

18. A display module configured to receive a first power supply voltage from a DC-DC converter external to the display module, the display module comprising:

a plurality of pixel circuits receiving the first power supply voltage; and a data driver configured to generate a value corresponding to a deviation of the first power supply voltage from a reference voltage, to change a power supply voltage of a gamma filter to generate a compensated gamma filter power supply voltage based on the value corresponding to the deviation of the first power supply voltage from the reference voltage, and to adjust a plurality of data signals for output to the plurality of pixel circuits based on the compensated gamma filter power supply voltage.

19. The display module as claimed in claim 18, further comprising a controller configured to control the data driver, wherein the controller does not supply signals to the DC-DC converter.

20. The display module as claimed in claim 18, further comprising:

a scan driver configured to generate scan signals and to output the scan signals; and a plurality of pixel circuits configured to receive the first power supply voltage from the DC-DC converter, the data signals from the data driver, and the scan signals from the scan driver.

21. The display module as claimed in claim 20, wherein the data driver comprises:

a voltage deviation determiner configured to determine the deviation of the first power supply voltage;

a voltage deviation compensator configured to apply the deviation of the first power supply voltage to a gamma filter power supply voltage to generate the compensated gamma filter power supply voltage; and a gamma voltage generator configured to generate a plurality of gamma voltages from the compensated gamma filter power supply voltage, wherein the data signals are generated from the plurality of gamma voltages.

22. The display module as claimed in claim 18, wherein the first power supply voltage is applied to pixel circuits of the display module with the deviation from the reference voltage.

23. The display apparatus as claimed in claim 18, wherein the first power supply voltage is applied to pixel circuits of the display module with the deviation from the reference voltage.

* * * * *